US011040303B2

(12) United States Patent
Taylor et al.

(10) Patent No.: US 11,040,303 B2
(45) Date of Patent: Jun. 22, 2021

(54) SYSTEMS AND METHODS FOR REMOVING ELEMENTAL SULFUR FROM A HYDROCARBON FLUID

(71) Applicant: Bechtel Hydrocarbon Technology Solutions, Inc., Houston, TX (US)

(72) Inventors: Martin A Taylor, Houston, TX (US); Charles L Kimtantas, Sugar Land, TX (US)

(73) Assignee: BECHTEL HYDROCARBON TECHNOLOGY SOLUTIONS, INC., Houston, TX (US)

( * ) Notice: Subject to any disclaimer, the term of this patent is extended or adjusted under 35 U.S.C. 154(b) by 0 days.

(21) Appl. No.: 16/367,839

(22) Filed: Mar. 28, 2019

(65) Prior Publication Data

US 2019/0217243 A1    Jul. 18, 2019

Related U.S. Application Data

(63) Continuation of application No. 14/113,868, filed as application No. PCT/US2011/040046 on Jun. 10, 2011, now Pat. No. 10,286,352.

(51) Int. Cl.
| | | |
|---|---|---|
| *B01D 53/04* | (2006.01) | |
| *C10K 1/00* | (2006.01) | |
| *C10K 1/32* | (2006.01) | |
| *C10G 25/12* | (2006.01) | |
| *C10G 25/00* | (2006.01) | |
| *C10G 25/05* | (2006.01) | |

(Continued)

(52) U.S. Cl.
CPC ............. *B01D 53/04* (2013.01); *B01D 53/06* (2013.01); *C10G 25/00* (2013.01); *C10G 25/05* (2013.01); *C10G 25/06* (2013.01); *C10G 25/12* (2013.01); *C10G 29/00* (2013.01); *C10G 29/20* (2013.01); *C10G 75/02* (2013.01); *C10K 1/004* (2013.01); *C10K 1/32* (2013.01); *C10L 3/101* (2013.01); *C10L 3/103* (2013.01); *C10G 2300/202* (2013.01); *C10L 2290/542* (2013.01)

(58) Field of Classification Search
CPC ........ B01D 53/04; B01D 53/06; C10K 1/004; C10K 1/32; C10L 3/101; C10L 3/103; C10L 2290/542; C10G 2300/202; C10G 25/06; C10G 29/00; C10G 75/02; C10G 29/20; C10G 25/12; C10G 25/00; C10G 25/05
See application file for complete search history.

(56) References Cited

U.S. PATENT DOCUMENTS 4,329,160 A * 5/1982 Sherman ................ B01D 53/02
                                                     95/136
4,522,793 A * 6/1985 Larson .................. B01D 53/04
                                                    423/230

(Continued)

OTHER PUBLICATIONS

Mexican Institute of Industrial Property, Office Action, Mexican Patent Application No. MX/a/2013/010792, dated Mar. 8, 2019, 2 pages, Mexican Institute of Industrial Property, Mexico.

(Continued)

*Primary Examiner* — Randy Boyer
*Assistant Examiner* — Juan C Valencia
(74) *Attorney, Agent, or Firm* — Crain, Caton and James

(57) ABSTRACT

Systems and methods for removing elemental sulfur from a hydrocarbon fluid using an adsorbent.

2 Claims, 1 Drawing Sheet

(51) Int. Cl.
    *C10G 25/06*     (2006.01)
    *C10G 29/00*     (2006.01)
    *C10G 29/20*     (2006.01)
    *C10G 75/02*     (2006.01)
    *C10L 3/10*     (2006.01)
    *B01D 53/06*     (2006.01)

(56) References Cited

U.S. PATENT DOCUMENTS

| | | | | |
|---|---|---|---|---|
| 6,482,316 | B1* | 11/2002 | Bal | C10G 25/00 |
| | | | | 208/299 |
| 7,517,389 | B2* | 4/2009 | Van De Graaf | B01D 53/04 |
| | | | | 95/135 |
| 2006/0204432 | A1* | 9/2006 | Dolan | C01B 17/0456 |
| | | | | 423/567.1 |
| 2011/0253595 | A1* | 10/2011 | Hamad | C10G 25/003 |
| | | | | 208/89 |

OTHER PUBLICATIONS

Francisco Javier Uhthoff Orive, Response to Office Action, Mexican Patent Application No. MX/a/2013/010792, dated Apr. 30, 2019, 3 pages, Uhthoff, Gomez, Vega & Uhthoff, Mexico City, Mexico.

Kasznar Leonardos Intellectual Property, Response to the Contrary Report, Brazilian Patent Application No. BR 112013031425-7, May 7, 2019, 7 pages, Kasznar Leonardos Intellectual Property, Brazil.

Xie Cong, First Office Action, Chinese Patent Application No. 201710547821.0, dated Jul. 2, 2019, 8 pages, National Intellectual Property Administration, PRC, China.

\* cited by examiner

SYSTEMS AND METHODS FOR REMOVING ELEMENTAL SULFUR FROM A HYDROCARBON FLUID

CROSS-REFERENCE TO RELATED APPLICATIONS

This application is a continuation of U.S. patent application Ser. No. 14/113,868 filed on Feb. 7, 2014, which is a U.S. National Stage of PCT Patent Application No. PCT/US11/40046, filed on Jun. 10, 2011, which are incorporated herein by reference.

STATEMENT REGARDING FEDERALLY SPONSORED RESEARCH

Not applicable.

FIELD OF THE INVENTION

The present invention generally relates to systems and methods for removing elemental sulfur from a hydrocarbon fluid. More particularly, the present invention relates to removing elemental sulfur from a hydrocarbon fluid using an adsorbent.

BACKGROUND OF THE INVENTION

Many natural gas and crude oils contain sulfur, as elemental sulfur and as sulfides, polysulfides, mercaptans and other organic and inorganic species. When elemental sulfur deposits as a solid, it can accumulate and result in flow constriction and can reduce the capacity in separation equipment. It can plug instrumentation connections, cause poor process control, and necessitates additional maintenance costs. When elemental sulfur is produced in conjunction with water, the elemental sulfur can be highly corrosive to the carbon steel piping and separation equipment typically used in oil and gas production, transportation and refining operations. The elemental sulfur can also combine with or react with production treating chemicals to form tars and other undesirable solids.

The solubility of elemental sulfur in natural gas is dependent on many factors including the hydrocarbon fluid composition, pressure and temperature of the fluid in the formation, at pressure reduction and cooling systems in the production piping. The solubility of elemental sulfur is strongly dependent on the concentration of other sulfur species such as $H_2S$, and the amount of liquid hydrocarbon associated with gas production. Additionally, solubility may be affected by the volume and salinity of any water produced and the concentration of carbon dioxide in the gas. Solubility of the sulfur may be reduced with reductions in pressure and temperature of the natural gas during movement from the formation into the production, transportation and processing equipment. Air contamination and interaction of sulfide species with oxidized forms of iron may be associated with production of elemental sulfur and thereafter precipitation.

Attempts have been made to use filters to remove the elemental sulfur as if it were a solid particle, but, since it is actually dissolved in the hydrocarbon fluid a filter will not remove the sulfur. However, the pressure drop associated with most solid particulate filters can cause some of the elemental sulfur to deposit on the downstream surface of the filter due to the reduction in solubility caused by the pressure drop of the filter, similar to the pressure drop of a pressure control valve. This does remove a small amount of the elemental sulfur that has dropped out of the solution, but there is still significant soluble and insoluble elemental sulfur remaining in the hydrocarbon fluid.

The prevention of precipitation of elemental sulfur has been the goal of various attempts in the art. These attempts having included actions to prevent oxygen ingress into production and handling operations with the goal of reducing formation of the elemental sulfur from other sulfur species, to designing production equipment with staged pressure drops with the goal of minimizing the potential deposition of elemental sulfur, and to heat the hydrocarbon fluid with the goal of maintaining any elemental sulfur as a dissolved vapor or as liquid elemental sulfur.

Additionally, in order to reduce conduit and equipment plugging in operations, it is typical to provide for the periodic or continuous injection of solvents to remove elemental sulfur deposits or prevent the elemental sulfur from depositing in the system. Solvents used in these operations may be physical solvents (e.g. hydrocarbons or hydrocarbon mixtures, coker gas oil, kerosene/diesel, mineral oil and aromatic solvents such as benzene and toluene) or chemical solvents (e.g. amine based chemicals including aqueous ethylamine and alkyl amines in aromatic solvents, and disulfide based solvents (e.g. dimethyl disulfide)).

The method of application and the amount of solvent are specifically designed or selected for each system. The application of these solvents is not without challenges. In gas production operations the solvents are produced with the gas to the gas plant. For some of the solvents the specific gravity of the solvent loaded with elemental sulfur can be equal to or higher than the specific gravity of the water produced, resulting in separation and handling problems at the gas plant. Some of the solvents can also cause operational problems with the downstream processes. In addition, not adding enough solvent can result in the downstream precipitation of elemental sulfur as the production cools. Each of the solvents has specific handling challenges. The disulfide based solvents have a noxious odor and are very difficult to handle. Coker gas oil has a bad odor and other solvents are linked to environmental, health and/or safety issues. The application of solvents is typically once through. This can result in a large expense associated with sulfur management.

The problem with the deposition of elemental sulfur in the various natural gas and crude oil production facilities and downstream processing equipment and conduits has been observed since at least the 1960's and research has been done to define the levels of elemental sulfur that might be present in hydrocarbon fluids and to help determine where in the system the elemental sulfur might be deposited. As a result, elemental sulfur deposits can become a major problem—especially as coal seam gas and oil shale gas production became a major hydrocarbon resource. Current methods for addressing this problem therefore, appear limited to washing out the elemental sulfur after it has deposited or preventing the elemental sulfur from depositing by tying it up with special solvents.

Other conventional methods do not actually use an adsorbent to remove elemental sulfur, which includes elemental sulfur, polymeric sulfur or zero-valent polymeric sulfur, from hydrocarbon fluids but do propose using an adsorbent to remove non elemental sulfur from hydrocarbon fluids. U.S. Pat. No. 5,686,056, for example, proposes using a filter media to adsorb and/or break down a hydrogen sulfide-sulfur polymer ($H_2S_x$) to hydrogen sulfide and sulfur, which is collected by the filter media. The hydrogen sulfide-sulfur polymer may be formed during the manufacture of a hydrogen sulfide product from hydrogen and elemental sulfur. As a result, the hydrogen sulfide product stream that was produced (manufactured) is cleaner after the sulfur and $H_2S_x$ is removed. The filter media described in the '056 patent, therefore, does not remove sulfur from naturally occurring or processed hydrocarbon fluids but is removing it from a manufactured hydrogen sulfide product stream.

SUMMARY OF THE INVENTION

The present invention overcomes one or more of the prior art disadvantages by providing systems and methods for removing elemental sulfur from hydrocarbon fluids using an adsorbent.

In one embodiment, the present invention includes a system for removing elemental sulfur from a hydrocarbon fluid, comprising: i) a vessel for the hydrocarbon fluid; ii) an adsorbent for removing the elemental sulfur from the hydrocarbon fluid, the adsorbent selected from the group consisting of alumina, activated alumina, activated carbon, gamma-activated alumina and molecular sieves and iii) a non-heated circulating gas stream in fluid communication with the adsorbent, the circulating gas stream comprising a portion of the hydrocarbon fluid without manufactured hydrogen sulfide.

In another embodiment, the present invention includes a method for removing elemental sulfur from a hydrocarbon fluid, comprising: i) treating the hydrocarbon fluid with an adsorbent selected from the group consisting of alumina, activated alumina, activated carbon, gamma-activated alumina and molecular sieves; and ii) removing a substantial portion of the elemental sulfur from the hydrocarbon fluid.

In yet another embodiment, the present invention includes a method for removing elemental sulfur from a hydrocarbon fluid, comprising: i) treating the hydrocarbon fluid with an adsorbent; and ii) removing a substantial portion of the elemental sulfur from a portion of the hydrocarbon fluid excluding manufactured hydrogen sulfide.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like numerals and in which.

DETAILED DESCRIPTION OF THE PREFERRED EMBODIMENTS

Figure 1A:
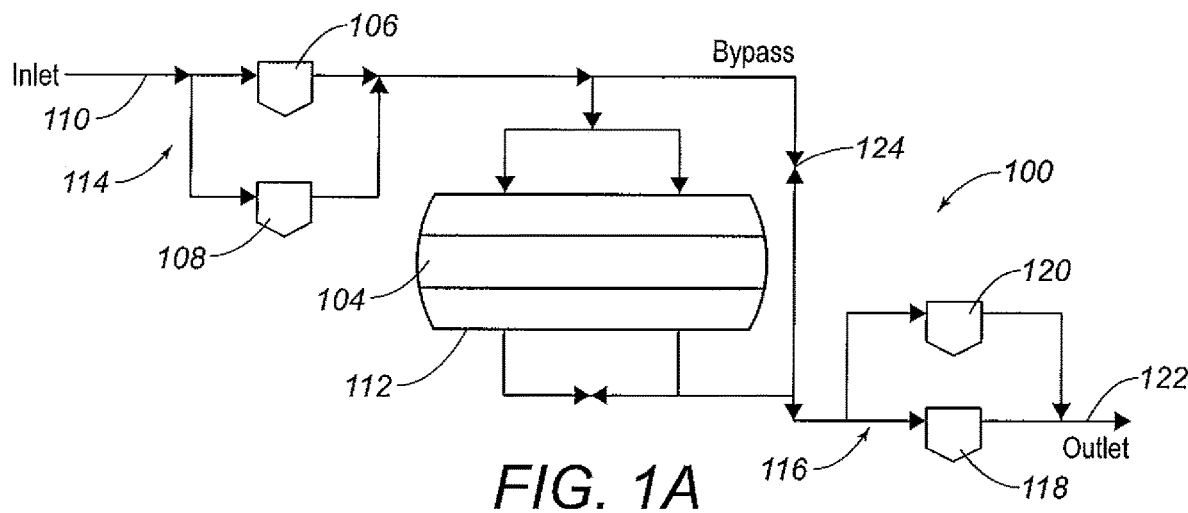
FIG. 1A illustrates one embodiment of a system for implementing the present invention.

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order.

The present invention provides systems and methods to prevent or reduce elemental sulfur deposition in conduits and equipment used in the oil and gas production, transportation, separation, and refining operations while the hydrocarbon fluids are being transported or processed in those conduits and equipment. While the following description refers to the oil and gas industry, the systems and methods of the present invention are not limited thereto and may also be applied in other industries to achieve similar results.

Sulfur species suitable for treatment according to the present invention include elemental sulfur, polymeric sulfur and zero-valent polymeric sulfur collectively referred to herein as elemental sulfur. For purposes of this description, elemental sulfur-containing fluids means hydrocarbon fluids containing elemental sulfur, which can be entrained, dissolved, solubilized, or dispersed in the fluid and are prone to precipitation or deposition onto the surfaces of the transportation or processing equipment.

Representative hydrocarbon fluids may include raw natural gas, processed natural gas, coal seam gas, oil shale gas, tar sands gas, synthesis gas, crude oils, distillates, condensates, and the like. Natural gas means a normally gaseous mixture of hydrocarbons, at least at ambient surface conditions of temperature and pressure, containing principally methane but also containing other light hydrocarbons such as ethane, ethylene, propane, butane or even higher molecular weight hydrocarbons. The natural gas can also contain varying amounts of carbon dioxide, as well as hydrogen sulfide, carbonyl sulfide, mercaptans and elemental sulfur. Thus, the hydrocarbon fluids may include, without limitation, pipeline quality natural gas, natural gas from a wellhead, and a hydrocarbon based refinery stream.

The conduits and equipment to be protected may include those used in natural gas transmission and distribution, or in natural gas processing, and those used in hydrocarbon production facilities. The adsorbent may also be used in combination with other treatments used in the production and/or transportation of hydrocarbon fluids.

The size of the purification equipment to be used may be empirically determined based upon the weight of expected or proven elemental sulfur content of the fluid. Equipment size can also be determined as a trade-off between capitol funds available, plot space available, pressure available, and desired time between adsorbent change-outs/regenerations.

The adsorbent may suitably be formed into extrudates, pellets or other shapes to permit the passage of hydrocarbon fluids over (e.g. around and through) the adsorbent. For this purpose, the active component of the adsorbent may consist of high internal surface area materials such as, for example, alumina, activated alumina, activated carbon, gamma-activated alumina and molecular sieves, which may be matrixed, bound and/or impregnated with inactive inorganic material such as clays, silica and/or other metal (or their oxides) such as, titanium, copper, cobalt, and molybdenum. The components of the adsorbent may be either naturally occurring or in the form of gelatinous precipitates or gels including mixtures of silica and metals (or their oxides.) It may be desirable to provide at least a part of the foregoing materials in colloidal form so as to facilitate extrusion of the adsorbent. The relative proportions of active material and matrix vary widely, with the active material content ranging from about 1 up to 100 percent by weight.

The temperature and pressure conditions may vary. The elemental sulfur recovery process may be conducted at a pressure of between about 5 atmospheres (atm) and 400 atm, or may be conducted in the narrower pressure range of between about 20 atm and 100 atm. The elemental sulfur recovery process may be conducted at a temperature of between about −5° F. and about 300° F., or may be conducted in the narrow temperature range of between about 15° F. and about 100° F.

Figure 1B:
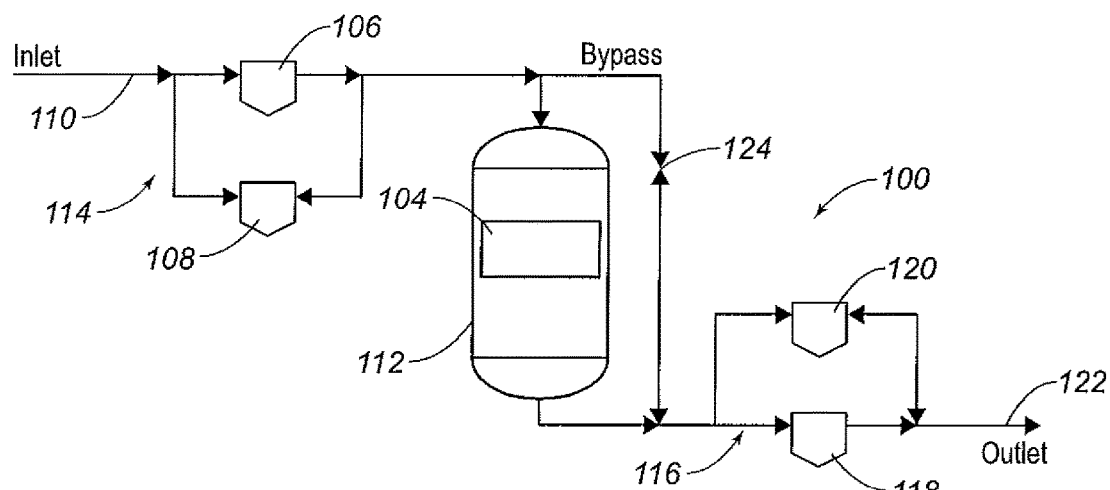
FIG. 1B illustrates another embodiment of a system for implementing the present invention.

In the embodiments depicted in FIG. 1A and FIG. 1B, the system 100 includes an adsorbent 104 where the adsorbent 104 is selected from the aforementioned groups.

The system 100 may include an inlet filteration system 114 having a particulate filter 106, typically sized to 10 microns, and, optionally, a spare particulate filter 108 through which the hydrocarbon fluid first passes via an inlet 110 before passing to a vessel 112 containing the adsorbent 104. The vessel 112 may be provided in any orientation, including as a horizontal vessel depicted in FIG. 1A or as a vertically aligned vessel depicted in FIG. 1B. The vessel 112 may be used in any orientation, depending on plot area, pressure drop available, the quantity of sulfur to be removed, and the desired frequency of adsorbent change-out. Moreover, the adsorbent 104 may be placed within the existing flow line of a pipe or may be incorporated into a vessel to avoid a pressure decrease/flow reduction in the flow line. The system 100 may also include an outlet filtration system 116 having a particulate filter 118, typically sized to 10 microns, and, optionally, a spare particulate filter 120 before exiting via an outlet 122. These inlet and outlet filteration systems are optional depending on the overall system configuration and possible use of special screens in the vessel 112. Finally, the adsorbent 104 may be fully or partially bypassed, if necessary, via a bypass 124.

Given the highly corrosive nature of elemental sulfur with respect to carbon steel piping and equipment and as the adsorbent may remove a substantial portion, but not all of the elemental sulfur, there is the possibility of some elemental sulfur deposits posing a corrosion risk. Accordingly, the adsorbent may be employed in combination with a corrosion inhibitor to further reduce the effect of sulfur deposition and the corrosion of the internal surfaces of a pipeline and equipment through which a sulfur-containing fluid is passing or being processed. Corrosion inhibitors which may be selected are well known in the art. Representative corrosion inhibitors include, but are not limited to, imidazolines, quaternary ammonium compounds, phosphate esters, and the like. In addition, multiple adsorbent beds may be installed directly in series, in parallel, or throughout the system to optimize the removal of elemental sulfur.

Figure 2:
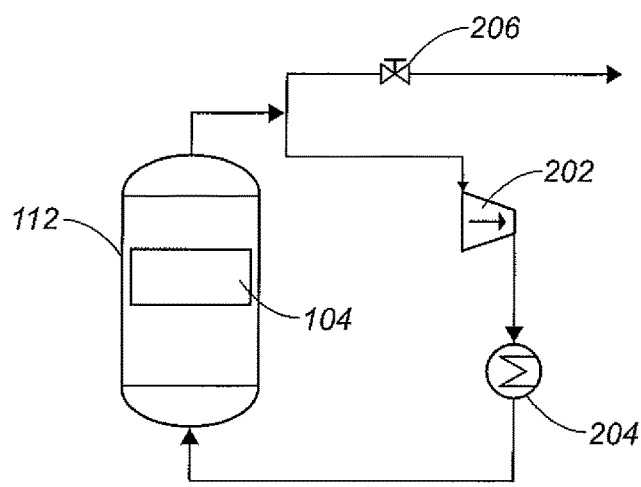
FIG. 2 illustrates one embodiment of a system for regeneration of the adsorbent according to the present invention.

As illustrated in FIG. 2, the adsorbent 104 may be regenerated to near original quality thus, avoiding discarding of the adsorbent. Regeneration may include using pressure letdown and/or circulation with heating and cooling of the circulating gas stream. The circulating gas stream may be the hydrocarbon fluid or may be an inert gas such as nitrogen or carbon dioxide. This may be accomplished by positioning the vessel 112 in a loop following a circulation blower 202 and a heater-cooler 204, after which the output is vented to a flare via a valve 206 or recycled to the vessel 112. Alternatively, the blower 202 and heater-cooler 204 may not be present since simple pressure reduction may be adequate to regenerate the adsorbent to proper quality.

In operation, a method for removing elemental sulfur from a hydrocarbon fluid may include treating the hydrocarbon fluid with an adsorbent selected from the foregoing group and removing a substantial portion of the elemental sulfur from the hydrocarbon fluid wherein the structure of the vessel used in conjunction with the method may be of the character and structure described above in reference to FIG. 1A and FIG. 1B. Alternatively, a method for removing elemental sulfur from a hydrocarbon fluid may include treating the hydrocarbon fluid with an adsorbent selected from the foregoing group and removing a substantial portion of the elemental sulfur from a portion of the hydrocarbon fluid excluding manufactured hydrogen sulfide.

The treatment may include moving the hydrocarbon fluid over the adsorbent or moving the adsorbent in the hydrocarbon fluid. In either case, the sulfur adsorbs onto the surface of the adsorbent or into the internal pores and internal surface area of the adsorbent. Once saturated with elemental sulfur, the adsorbent may be disposed of in an acceptable manner or regenerated by i) pressure reduction; ii) heat addition; and/or iii) the use of a fluid swept through the adsorbent bed. The treatment may further include treating the hydrocarbon fluid with a corrosion inhibitor, which may be selected from the group consisting of imidazolines, quaternary ammonium compounds and phosphate esters.

The foregoing may be better understood by reference to the following example, which is presented for purposes of illustration only.

Example

A natural gas stream can contain from less than 1 part per billion to over 100,000 parts per billion of soluble elemental sulfur depending on the pressure, temperature, and gas composition. When the gas stream is at its elemental sulfur saturation pressure and associated temperature, as the pressure is reduced and/or the temperature is reduced the elemental sulfur can desublimate and deposit in the conduits and equipment.

An example gas stream of natural gas at 70 atm and 75° F. could contain about 20 parts per billion of elemental sulfur. If the pressure is reduced through a throttling valve, then the gas will also get cooler. Going from about 70 atm and 75° F. to a pressure of about 60 atm, the gas will cool to about 67° F. (depending upon the composition) and the elemental sulfur saturation level of the gas will be reduced to about 7 parts per billion. The resultant reduction of solubility will cause the elemental sulfur to desublimate and deposit elemental sulfur. With a gas flow rate of 100 million cubic feet per day, this represents 39 lbs per year of elemental sulfur deposited in the conduits and equipment.

With the systems for implementing the present invention, the elemental sulfur in the gas stream should be reduced from about 20 parts per billion to about 2 [1/10 of 20] parts per billion or less. Now when the gas pressure is reduced from 70 atm to 60 atm, the elemental sulfur will not desublimate and deposit in the conduits and equipment, since the available solubility of the elemental sulfur (about 7 parts per billion) in the gas is much greater than the elemental sulfur left in the gas streams after the adsorbent (about 2 parts per billion or less).

As demonstrated herein, when a hydrocarbon fluid containing elemental sulfur is passed over a representative adsorbent, the adsorbent effectively removes the elemental sulfur from the hydrocarbon fluid.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A system for removing elemental sulfur from a hydrocarbon fluid, comprising:
   a vessel for the hydrocarbon fluid;
   an adsorbent for removing the elemental sulfur from the hydrocarbon fluid, the adsorbent selected from the group consisting of activated alumina, gamma-activated alumina and molecular sieves; and
   a non-heated circulating gas stream in fluid communication with the adsorbent, the circulating gas stream comprising a portion of the hydrocarbon fluid without manufactured hydrogen sulfide.

2. The system of claim 1, wherein the adsorbent is positioned within the vessel.

* * * * *